United States Patent Office 3,474,865
Patented Oct. 28, 1969

3,474,865
STIMULATION OF INJECTION WELLS WITH
WATER-EXTERNAL MICELLAR DISPERSIONS
William B. Gogarty and Stanley C. Jones, Littleton, Colo.,
assignors to Marathon Oil Company, Findlay, Ohio,
a corporation of Ohio
No Drawing. Filed Mar. 12, 1968, Ser. No. 712,346
Int. Cl. E21b 43/20, 43/22
U.S. Cl. 166—274
10 Claims

ABSTRACT OF THE DISCLOSURE

Minislugs of water-external micellar dispersions are injected into injection wells to increase the injectivity index of the well. It is postulated, inter alia, that the dispersion reduces the residual hydrocarbon saturation in the sand pores immediately adjacent the well bore and also overcomes adversities of "skin damage."

BACKGROUND OF THE INVENTION

United States Patent Nos. 3,330,344 and 3,348,611 to Reisberg teach flooding with a water-external solution containing swollen micelles of a surfactant and an amphiphilic polar organic compound. Reisberg teaches that these solutions will solubilize the crude oil in sand packs.

Water injection rate in an injection well is dependent upon bottom hole pressure, effective permeability of the reservoir within the immediate vicinity of the well bore, pressure differential between the well bore and reservoir, etc. High injection rates are desirable from an economic and operational standpoint in secondary recovery processes. Because of reservoir geometry, i.e. injection of water at an area immediately adjacent to the well bore, injection rates are reduced as a consequence of the residual oil saturation within this immediate area. This residual oil causes a lower value of permeability with respect to water flow than would exist if the reservoir surrounding the well bore were 100% saturated with water. Also, adversities of "skin damage" impede the injection of water—from an operational basis this is realized by a very large pressure differential across the skin. Injection rates can be greatly improved by reducing the residual oil saturation in the immediate area (up to 20 feet away from the well bore) of the well bore and overcoming the adversities of skin damage.

This invention relates to the recovery of petroleum crudes by secondary recovery means and more particularly to the injection of a small slug of a water-external micellar dispersion to improve the injection index of injection wells.

DESCRIPTION OF THE INVENTION

The term "micellar dispersion" as used herein is meant to include micellar solutions (examples include those taught in U.S. 3,300,344 to Reisberg), water-external "micro-emulsions" [Schulman and Montagne, Annals of the New York Academy of Sciences, 92, pages 366–371 (1961)], "transparent" emulsions, and micellar dispersion technology taught by C. G. Sumner, Clayton's, The Theory of Emulsions and Their Technical Treatment, 5th edition, pp. 315–320 (1954). Examples of micellar dispersions include those taught in U.S. 3,348,611 to Reisberg. Micellar dispersions differ from emulsions in many ways, the strongest differentiation being that the former are thermodynamically stable whereas the latter are not.

The micellar dispersions of this invention are water-external. That is the hydrocarbon phase is internally dispersed. In an oil-external micellar dispersion the water phase is internally dispersed.

Preferably, the micellar dispersion is composed essentially of hydrocarbon, an aqueous medium, petroleum sulfonate sufficient to impart phase stability to the solution, optionally but preferably semi-polar organic compound and optionally electrolyte. Examples of volume amounts are from 1% to about 50% of hydrocarbon, from about 40% to about 95% aqueous medium, at least about 4% sulfonate, from about 0.01% to about 5% or more of semi-polar compound and up to about 4% or more by weight of electrolyte in the aqueous medium. In addition, the dispersions can contain corrosion inhibiting agents, bactericides, etc.

Examples of hydrocarbon include crude oil (both sweet and sour) and partially refined fractions thereof, e.g., side cuts from crude columns, crude column overheads, gas oils, kerosene, heavy naphthas, naphthas, straight-run gasoline, and liquefied petroleum gases. Pure hydrocarbons are also useful, e.g. paraffinic compounds including liquefied petroleum gases, propane, pentane, heptane, decane, dodecane, etc.; cycloparaffins compounds including cyclohexane, etc.; aryl compounds including benzene, naphthalene, anthracene, etc.; alkylated products thereof including toluene, alkyl phenols, etc. Based on economics, the preferred hydrocarbon is one locally available and is crude oil. The unsulfonated hydrocarbon (e.g. heavy vacuum gas oils) in petroleum sulfonates is also useful.

The aqueous medium can be soft, brackish, or a brine. Preferably, the water is soft but it can contain small amounts of salts which are compatible with the ions in the subterranean formations being flooded.

Surfactants useful with the micellar solutions include nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n - dodecyl - diethyleneglycol sulfate, monobutylphenyl phenol sodium sulfate, and triethanolamine laurate or triethanolamine oleate. Other useful surfactants include Duponol WAQE (a 30% active sodium lauryl sulfate marketed by DuPont Chemical Corporation, Wilmington, Del.), Energetic W–100 (a polyoxyethylene alkyl phenol marketed by Armour Chemical Company, Chicago, Ill.), Triton X–100 (a polyoxyethylene alkyl phenol marketed by Rohm & Haas, Philadelphia, Pa., Arquad 12–50 (a 50% active dodecyl trimethyl ammonium chloride marketed by Armour Chemical Company, Chicago, Ill.), and the Pluronic Polyols (polyoxyethylenepolyoxypropylene marketed by Wyandotte Chemical Company, Wyandotte, Mich.).

Petroleum sulfonates are the preferred surfactant with the micellar dispersion. Such can be obtained by sulfonating at least a portion of a sulfonatable hydrocarbon (e.g. gas oils) and then neutralizing the mixture, e.g. with NH$_4$OH, NaOH, etc. The sulfonate can contain, for example, 30–100% active sulfonate. Unsulfonated hydrocarbon within the sulfonates is useful as the hydrocarbon within this invention. Examples of preferred surfactants are the sodium and ammonium petroleum sulfonates having an average molecular weight of from about 360 to about 520, and more preferably from about 420 to about 470. The sulfonate can be a mixture of low and high molecular weight sulfonates.

The semi-polar organic compound (also known as cosurfactants and cosolubilizers) useful with the invention can have limited water solubility. However, compounds having 0 to infinite water solubility are useful. Preferably, they have limited water solubility of from about 0.01% to about 20% and more preferably from about 1% to about 5% at ambient temperature. Examples of semi-polar compounds include alcohols, amino compounds, esters, aldehydes and ketones containing from 1 up to about 20 or more carbon atoms and more preferably from 3 to about 16 carbon atoms. The semi-polar compound is preferably an alcohol, e.g. isopropanol, n- and isobutanol, the amyl alcohols such as n-amyl alcohol, 1- and 2-hexanol, 1- and 2-octanol, decyl alcohols, alkaryl alcohols such as p-nonyl phenol and alcoholic liquors such as fusel oil. Particularly useful alcohols include the primary butanols, primary pentanols and secondary hexanols. Concentrations of from about 0.01% to more than about 5 volume percent of the semi-polar organic compound are useful in the micellar dispersion and more preferably from about 0.2 to about 3%. Mixtures of two or more semi-polar compounds are useful in the micellar dispersions.

Electrolytes useful include inorganic bases, inorganic acids, inorganic salts, organic bases, organic acids, and organic salts which are strongly or weakly ionized. Preferably, the electrolytes are inorganic bases, inorganic acids and inorganic salts, e.g. sodium hydroxide, sodium chloride, sodium sulfate, hydrochloric acid, sulfuric acid, sodium nitrate, ammonium chloride, ammonium hydroxide, and potassium chloride. Examples of other useful electrolytes can be found in United States Patent No. 3,330,344. The type and concentration of electrolyte will depend on the aqueous medium, sulfonate, semi-polar organic compound, hydrocarbon and on the reservoir temperature and reservoir fluids. The use of acids or neutral salts is preferred with dispersions containing hydrophilic sulfonates and high reservoir temperatures. Electrolytes yielding a higher pH, e.g. NaOH, are preferred with more oleophilic sulfonates.

Preferably, the mobility of the micellar dispersion is about equal to or less than the mobility of the fluids ahead of it, i.e. the combination of the crude oil and formation water within the subterranean formation.

The micellar dispersion acts like it is miscible both with crude oil and with formation water. Another characteristic is that it can take up an unlimited amount of water.

The amount of micellar dispersion injected into the well depends upon the thickness of the oil-bearing sand. Generally from about 0.25 to about 10 barrels or more of the dispersion per vertical foot of oil-bearing sand is sufficient to improve the injectivity index. Larger quantities of the dispersion are useful, however, increased costs generally are unfavorable to the result obtained by such amounts. In most cases, from about 1 to about 5 barrels of the water-external dispersion give good results.

Normally, the amount of dispersion need be sufficient to extend from the well bore only three to twenty feet into the formation. Preferably, the amount of injected slug need displace substantially all hydrocarbon from the pores in the formation adjacent the well bore to at least seven and no more than fifteen feet. In terms of reservoir pore volume, for example, the amount of injected slug at the ten foot radius in a reservoir of ten foot thickness in a ten acre pattern can be about 0.002 pore volume. It is realized that the slug will be dissipated prior to reaching a production well, however, the increase in injectivity index and the buildup of a small oil bank ahead of the injected soluble oil materially aids in flooding operation.

Injectivity index as used herein is defined as the injection rate in barrels per day to the excess pressure above reservoir pressure which causes that injection rate. It can be defined by the formula:

$$\text{Injectivity Index} = I = \frac{q}{(p_w - p_e)} \text{ bbl./day/p.s.i.}$$

wherein $p_w$ is the sand-face pressure, $p_e$ is the reservoir static pressure measured at a point about equal distance between the injection and producing wells and $q$ is the injection rate in bbl./day.

The dispersion preferably is injected into the formation at a pressure below the formation fracture pressure.

After injection of the micellar dispersion is completed, water is injected into the formation through the injection well. The micellar dispersion can remain in contact with the sands immediately adjacent the well bore for sufficient time to insure complete solubilization of the residual oil, e.g. up to about 6 hours or more. Thereafter, water can be injected to displace the dispersion out into the formation. Increased injection rates at a given pressure of up to about 400% and more can be realized from this invention.

The invention is not to be limited by the enumerated components of the micellar dispersion or particulars associated therewith. Rather, it is intended that all equivalents obvious to those skilled in the art be included within the scope of the invention.

What is claimed is:

1. A process of increasing the water injection rate of an injection well in a subterranean oil-bearing formation, the process comprising injecting into the formation a water-external micellar dispersion in an amount sufficient to displace substantially all of the crude oil from no more than the pore space adjacent the well bore to a radius of from about 3 to about 20 feet.

2. The process of claim 1 wherein from about 0.25 to about 10 barrels per vertical foot of oil-bearing sand are injected into the formation.

3. The process of claim 1 wherein from about 1 to about 5 barrels of micellar dispersion per vertical foot of oil-bearing sand are injected into the formation.

4. A process of improving the injectivity index of an injection well in a subterranean oil-bearing formation, the process comprising injecting into the formation from about 0.25 to about 10 barrels of a water-external micellar dispersion per vertical foot of oil-bearing sand and then continuing water injection into the injection well.

5. The process of claim 4 wherein from about 1 to about 5 barrels of the water-external micellar dispersion are injected into the subterranean formation.

6. The process of claim 4 wherein the mobility of the dispersion is about equal to or less than the mobility of the fluids in the formation ahead of the dispersion.

7. The process of claim 4 wherein the dispersion remains in contact with the oil-bearing sand for a time up to about 6 hours before water is injected into the well.

8. The process of claim 4 wherein the micellar dispersion is injected at a pressure less than the formation fracture pressure.

9. A process of recovering crude oil from subterranean oil-bearing formations wherein an oil-displacing material is injected into a subterranean formation through at least one injection means and oil is produced from said formation through at least one production means, the step comprising injecting into said formation a water-external micellar dispersion in an amount sufficient to displace substantially all of the oil from no more than the pore space adjacent the well bore to a distance of 3–20 feet.

10. The process of claim 9 wherein the volume of dispersion injected is sufficient to displace substantially all hydrocarbon from the pore space adjacent the well bore to a distance of from about 7 to about 15 feet.

References Cited

UNITED STATES PATENTS

| | | | |
|---|---|---|---|
| 3,261,399 | 7/1966 | Coppel | 166—9 |
| 3,266,570 | 8/1966 | Gogarty | 166—9 |
| 3,288,216 | 11/1966 | Blickensderfer et al. | 166—42 |
| 3,297,084 | 1/1967 | Gogarty et al. | 166—9 |
| 3,330,344 | 7/1967 | Reisberg | 166—9 |
| 3,348,611 | 10/1967 | Reisberg | 166—9 |
| 3,373,809 | 3/1968 | Cooke | 166—9 |
| 3,422,890 | 6/1969 | Darley | 166—9 |

STEPHEN J. NOVOSAD, Primary Examiner

U.S. Cl. X.R.

166—275